United States Patent [19]

Lindner et al.

[11] Patent Number: 4,504,370

[45] Date of Patent: Mar. 12, 1985

[54] METHOD AND APPARATUS FOR ELECTROCHEMICAL MACHINING

[75] Inventors: Horst J. Lindner; Peter P. Ufer; Klaus Heck; Gerhard Schmöger, all of Ingolstadt, Fed. Rep. of Germany

[73] Assignee: Audi Nsu Auto Union, Ingolstadt, Fed. Rep. of Germany

[21] Appl. No.: 576,900

[22] Filed: Feb. 3, 1984

[30] Foreign Application Priority Data

Feb. 2, 1983 [DE] Fed. Rep. of Germany ....... 3303585

[51] Int. Cl.$^3$ .......................... B23P 1/00; B23P 1/16; B23P 1/02
[52] U.S. Cl. .......................... 204/129.1; 204/129.75; 204/224 M; 204/237; 204/273; 204/277; 204/DIG. 13
[58] Field of Search .................... 204/237, 238, 129.1, 204/129.75, 224 M, 277, 273, DIG. 13

[56] References Cited

U.S. PATENT DOCUMENTS

| 3,994,790 | 11/1976 | Inoue | 204/129.75 X |
| 4,040,920 | 8/1977 | Takada et al. | 204/129.75 |
| 4,153,524 | 5/1979 | Roche et al. | 204/129.75 X |

FOREIGN PATENT DOCUMENTS 458413 3/1975 U.S.S.R. .......................... 204/129.75

Primary Examiner—Donald R. Valentine
Attorney, Agent, or Firm—Lalos, Leeds, Keegan, Lett, Marsh, Bentzen & Kaye

[57] ABSTRACT

The disclosure relates to a process and apparatus for the treatment of sodium-nitrate-containing electrolytes during the electrochemical machining of the surfaces of iron-containing workpieces. By adding an oxidizing agent, more particularly ozone, increased production of nitrite in the electrolyte is prevented and, thereby, premature passivation of the surface of the workpiece during the electrochemical metal removal. An apparatus for the oxidation of the electrolyte is comprised of a processing station inserted into the electrolyte circuit, an ozone generator, and a reactor.

8 Claims, 2 Drawing Figures

METHOD AND APPARATUS FOR ELECTROCHEMICAL MACHINING

BACKGROUND AND DISCUSSION OF THE INVENTION

The invention relates to a process for the treatment of sodium-nitrate-containing electrolytes during the electrochemical machining (ECM) of the surfaces of iron-containing work pieces. The invention is also concerned with an apparatus for implementing said process.

In electrochemical machining (ECM), e.g., in electrochemical metal working or in electrochemical honing of the working surfaces of the cylinders of internal combustion engines, sodium nitrate ($NaNO_3$) solvents are normally used as electrolyte. During the anodic metal dissolution the nitrate is reduced into nitrite according to the following formula:

$$NO_3^{(-)} + 2[H] \rightarrow NO_2^{(-)} + H_2O$$

The increasing nitrite content in the electrolyte resulting therefrom forms on the surface of the workpiece to be eroded passive layers that more or less reduce the efficiency of the electrochemical machining. Accordingly, with constant current density, the surface erosion diminishes in an indefinite manner.

To some extent this can be compensated for by increasing the current density or the specific power input, but one has to reckon with another drawback in the form of an overheating of the electrolyte that, under certain conditions, requires appropriate cooling devices. In addition, more oxygen is generated at the anode and more hydrogen at the cathode, which is likewise a disadvantage for the machining efficiency.

As an example, to prevent the formation of oxygen and hydrogen, e.g., during electrochemical metal working, the electrochemical metal working, the electrochemical machining process is carried out in a pressure vessel. Moreover, the process is carried out at a higher electrolyte velocity, which requires corresponding electrolyte pressures and pump capacities and which leads to greater abrasion at the carbon electrodes.

The nitrite content of the metal sludge carried away from the surface of the workpiece and separated from the electrolyte must be detoxified, so that the sludge can be carried to a dumping ground. During the oxidation process, the sludge can be oxidized up to a higher oxidation state by adding sodium hypochloride or hydrogen peroxide. In this case, the pH value must lie between 3 and 4. In an alternative reduction process in the weak-acid region, the nitrite is reduced into nitrogen with amidosulphuric acid or urea, resulting in the production of sulphuric acid or carbonic acid.

In both processes, a flocculant must be added in order better to coagulate the iron hydroxide sludge. Therefore, in order to detoxify the nitrite, both processes require a large amount of equipment and, hence, considerable investment capital. Also, there are significant day-to-day expenses for chemicals.

The primary object of the invention is to provide a process that enables an electrochemical erosion with higher efficiency and better control and with which the metal sludge can be eliminated economically. The invention is also concerned with a particularly effective and cost-efficient apparatus for carrying out the process.

A surprising fact found by the inventor was that by continuously adding an oxidizing agent (preferably ozone ($O_3$)) the nitrite can be oxidized into a nitrate in the basic region. As a result, during the electrochemical machining, the formation of passive layers on the surface of the workpiece being processed is prevented, thus improving the machining efficiency. This results in a higher removing capacity and shorter machining times.

Furthermore, the continuous addition of the oxidizing agent causes colloidally dissolved iron-II-hydroxide to be oxidized into precipitatable iron-III-hydroxide (metal sludge). This results in better flocculation of the sludge at a higher rate of descent, so that the expenditure for the disposal of toxic waste from the installation is reduced. Therefore, the addition of flocculants can be dispensed with.

Finally, less gas ($O_2 + H_2$) is generated because of the low nitrite content in the electrolyte and the resultant reduced passive layer formation on the workpiece. Thus, one can work with lower electrolyte current velocities and, if carbon electrodes are used, this leads to less abrasion and, hence, to longer electrode residence times.

The oxidizing agent can be added to effect the advantages above and, in the case of a high metal removal capacity, an addition in the main current of the electrolyte has proved to be beneficial.

The electrolyte is treated until the mean content of the electrolyte in the oxidizing step is lowered sufficiently. Preferably, nitrite content of the removed iron hydroxide sludge separated from said electrolyte drops below about 20 mg/l. The metal sludge then can be carried—with due regard to current legal obligations—to the dumping ground without special detoxification.

According to the features discussed above, the passivation layer on the surface of the workpiece can to a certain extent be controlled, which can be beneficial with respect to a well-defined surface structure of the workpiece to be machined—particularly during electrochemical friction plating of the working surfaces of cylinders as disclosed in Unexamined West German Application No. 31 19 847.

The invention includes an apparatus for solving the problems discussed above. Thus, the continuous oxidation of the nitrite into a nitrate in the electrolyte can be effected by means of a processing station switched into the electrolyte circuit. Such a processing station can, for example, also be retrofitted in older installations.

The processing station can be constructed or arranged to inject an oxidizing agent into the electrolyte at the proper place in the circuit. The generation of ozone can be brought about by radio discharge. An intensive, continuous reaction of the ozone with the nitrite to form a nitrate occurs in the reactor. Gas evolution of the metal sludge is prevented by separating the metal sludge ahead of the processing station (reactor), allowing the metal sludge to settle quickly.

Further details of the invention will become apparent from a consideration of the ensuing description of a specific embodiment of the invention.

DETAILED DESCRIPTION OF THE PREFERRED EMBODIMENT

Figure 1:
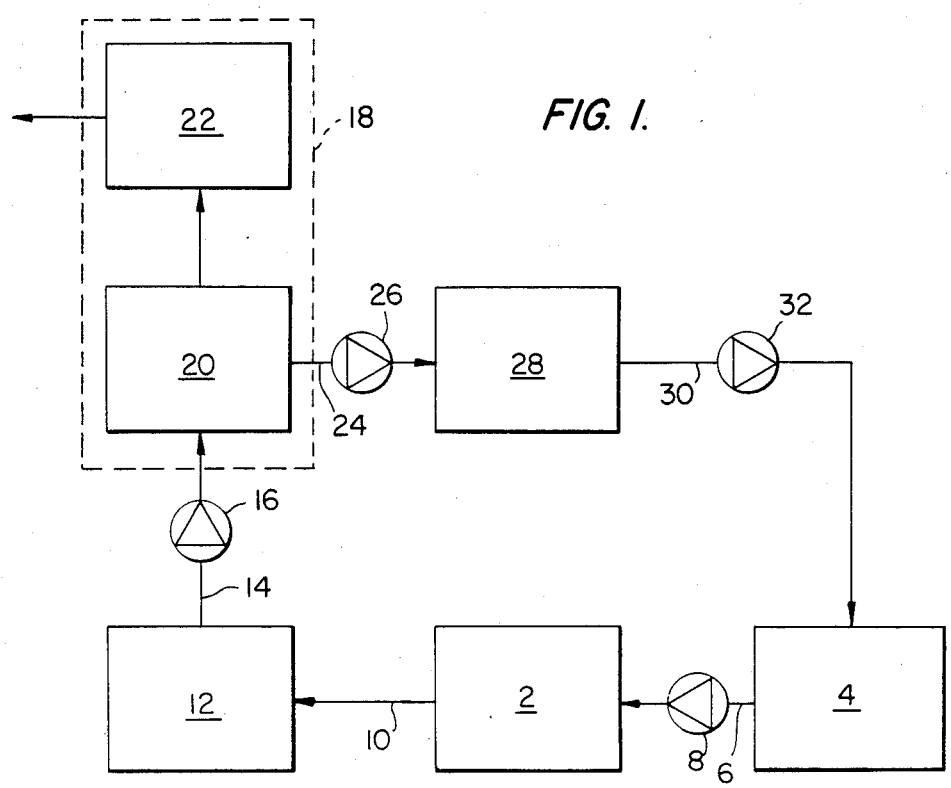
FIG. 1 is a block diagram of a process embodying the principles of the invention; and, FIG. 2 is a schematic representation of a processing station.

In FIG. 1, reference numeral 2 denotes an electrochemical machining station in which working surfaces of the cylinders of a reciprocating internal combustion engine are machined. In a manner not shown, the cylinder block made of gray cast iron is connected to the positive potential of a current source and a cylindrical electrode is connected to its negative potential. The electrolyte that is added for the electrochemical metal removal consists of a solvent containing 25% $NaNO_3$. Details of the electrochemical honing and of the tool used therefore are, for example, described in the dissertation published on June 22, 1968 under the title "Examination of Electrochemical Honing" by Egbert Scholz of Aachen Technical University.

The electrolyte is fed to machining station 2 from a storage tank 4 by means of a pump 8 through piping 6. The electrochemical machining is known in the art and is therefore not explained in detail herein. The electrode is inserted into the workpiece, the the electrolyte circuit is activated and the current supply switched into circuit. During the metal dissolution at the anode, the nitrate is reduced into a nitrite according to the following formula:

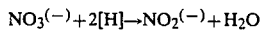

$$NO_3^{(-)} + 2[H] \rightarrow NO_2^{(-)} + H_2O$$

The electrolyte, mixed with removal material or metal sludge consisting of iron-III-hydroxide and passing through machining station 2, flows to sludge separator 18 via piping 10, intermediate tank 12, piping 14 with another pump 16. Sludge separator 18 comprises an inclined settling tank 20 and a sludge-dehydration unit 22. The metal sludge is separated from the sludge-dehydration unit as an airtight sludge ready to be carried to the dumping ground. The electrolyte separated from the metal sludge is routed from inclined settling tank 20 via piping 24 and third pump 26 to a processing station 28 that introduces the oxidizing agent or the ozone. Following oxidation of the electrolyte, which will be described hereinafter, the electrolyte is returned via piping 30 and by means of another pump 32 to storage tank 4.

Figure 2:
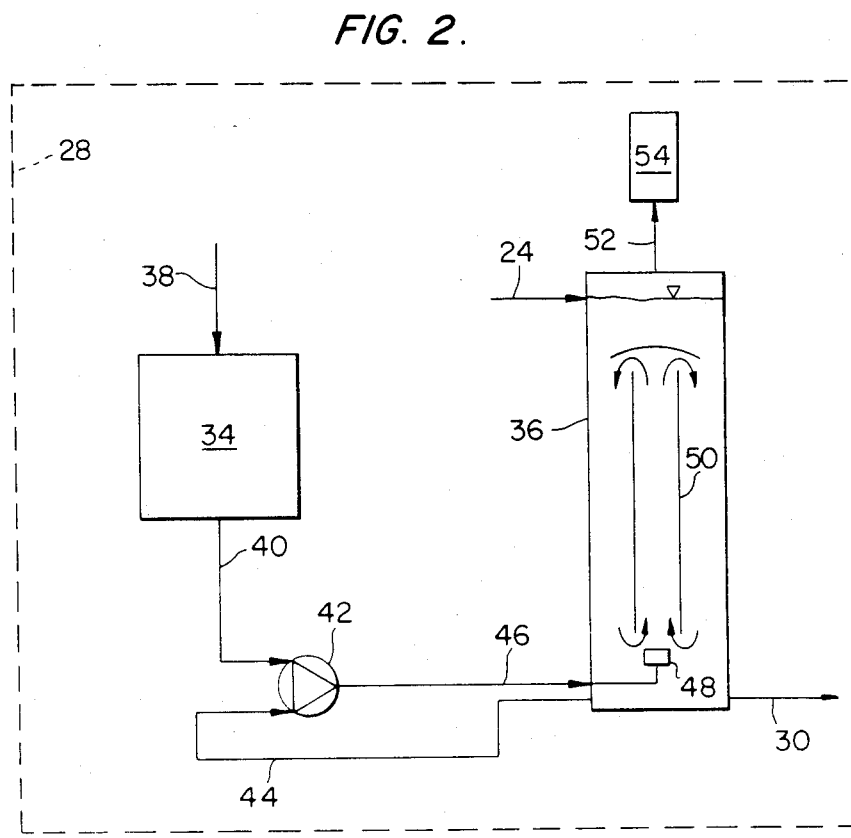

FIG. 2 shows the processing station 28 which essentially consists of ozone generator 34 and reactor 35. Air is supplied to the ozone generator via piping 38 by means of which ozone is produced through a high-voltage discharge. The ozone is routed via piping 40 to pump 42 into whose suction side runs another piping 44 connected to reactor 36. Thus, in pump 42 ozone and the electrolyte in reactor 36 are drawn in and fed via mixing pipe 46 to a sprinkler-type inlet within reactor 36.

Inlet 47 forms with concentric inner piping 50 in reactor 36 a mammoth pump, by means of which the electrolyte in reactor 36 is intensively swirled according to the counter flow principle and mixed with ozone, during which the nitrite in the electrolyte is oxidized with ozone to form a nitrate. The electrolyte is fed into the reactor via piping 24, while oxidized electrolyte is discharged via piping 30 into storage tank 4. At the highest geodetic point, the ozone evaporating in reactor 35 is fed via piping 52 to an active-carbon container 54 and broken down to form $O_2$ therein. As a result of the continuous oxidation of the electrolyte in processing station 28, the mean nitrite content in the electrolyte is kept so low that rapid and premature passivation of the surface of the workpiece during the electrochemical machining is avoided and the nitrite content in the precipitated sludge lies below the legally prescribed volume of 20 mg/l.

What is claimed is:

1. A process for electorchemical machining of the surface of an iron-containing workpiece comprising: delivering to a work station sodium nitrate-containing electrolytes for removing metal from the workpiece; adding substantially continuously ozone as an oxidizing agent to electrolyte withdrawn from the work station to oxidize the nitrite formed during the metal removing step; and returning the oxidized nitrite as nitrate in the electrolyte to the work station.

2. The process as set forth in claim 1, wherein electrolyte is delivered in at least one of main current and a bypass circuit during said metal removal in at least one of the main current or in the bypass circuit.

3. the process as set forth in claim 1 or 2, wherein iron hydroxide sludge is produced at said work station and removed with electrolyte, and wherein the mean nitrite content of said electrolyte in said oxidizing step is lowered until the nitrite content of the removed iron hydroxide sludge separated from said electrolyte drops below about 20 mg/l.

4. The process as set forth in claim 3, wherein by control of said nitrite content in said electrolyte, the build up of passive layers on said workpiece surface is substantially prevented.

5. An apparatus for electrochemical machining an iron containing workpiece comprising an electrochemical machining station, a storage tank for storing electrolyte used at said machining station, a sludge separator for separating sludge from electrolyte developed at said machining station, an electrolyte circuit for delivering electrolyte to said station, at least one pump, said station, tank, separator and pump forming an electrolyte circuit for delivering said electrolyte there through, and means for injecting into said circuit ozone oxidizing agent.

6. The apparatus as set forth in claim 5, wherein said means for injecting into said circuit an ozone oxidizing agent, includes means for causing said ozone to react with said electrolyte.

7. The apparatus as set forth in claim 6, wherein said means for injecting ozone includes a processing station inserted into said electrolyte circuit downstream of said sludge separator.

8. The apparatus as set forth in any one of claims 6 or 7, wherein said processing station includes an ozone generator and reactor having a sprinkler inlet for mixing ozone with electrolyte drawn off from said reactor by means of a pump and delivering to said reactor via a sprinkler inlet during which said inlet together with a mixing tube in said reactor forms a pump for intensively swirling said electrolyte and said ozone in said reactor.

* * * * *